United States Patent [19]

Takeda et al.

[11] 4,258,299

[45] Mar. 24, 1981

[54] APPARATUS FOR CONTROLLING THE SPEED AND DIRECTION OF ROTATION OF A DC MOTOR

[75] Inventors: Masashi Takeda, Isehara; Susumu Hoshimi; Toshio Sato, both of Yokohama, all of Japan

[73] Assignee: Sony Corporation, Tokyo, Japan

[21] Appl. No.: 6,906

[22] Filed: Jan. 26, 1979

[30] Foreign Application Priority Data

Feb. 1, 1978 [JP] Japan .................................. 53/10170

[51] Int. Cl.³ .............................................. H02P 6/02
[52] U.S. Cl. ................................... 318/258; 318/254; 318/138
[58] Field of Search ................ 318/138, 254, 254 A, 318/257, 258, 261, 269, 283, 285, 290, 302, 308, 312, 328, 330, 341, 345, 365, 369, 439, 450, 464, 465

[56] References Cited

U.S. PATENT DOCUMENTS

| | | | |
|---|---|---|---|
| 2,724,081 | 11/1955 | De La Source | 318/308 |
| 3,221,235 | 11/1965 | Scholl | 318/330 X |
| 3,221,236 | 11/1965 | Scholl | 318/330 X |
| 3,903,463 | 9/1975 | Kanamori | 318/254 X |
| 3,953,776 | 4/1976 | Wolf | 318/312 |
| 4,076,999 | 2/1978 | Edwards et al. | 318/465 |

Primary Examiner—Gene Z. Rubinson
Assistant Examiner—John W. Redman
Attorney, Agent, or Firm—Lewis H. Eslinger; Alvin Sinderband

[57] ABSTRACT

A single pickup head generates an alternating signal proportional to the rotational speed of a DC motor which can be rotated in either of two directions, and such alternating signal is employed by speed and/or phase control circuits to control the motor speed relative to a reference speed in a selected one of the two directions. An overspeed sensing circuit detects speed runaway, which can occur when the motor is rapidly rotated in the direction opposite to the selected direction, and the overspeed sensing circuit then interrupts the motor drive voltage until the motor speed decreases to below its normal speed. At and below normal speed in the undesired direction, the normal torque acts in the selected direction to rapidly reverse the direction and to accelerate the motor to normal speed in the selected direction.

16 Claims, 23 Drawing Figures

FIG. 1
PRIOR ART
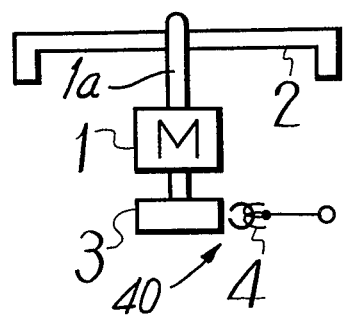
FIG. 2
PRIOR ART
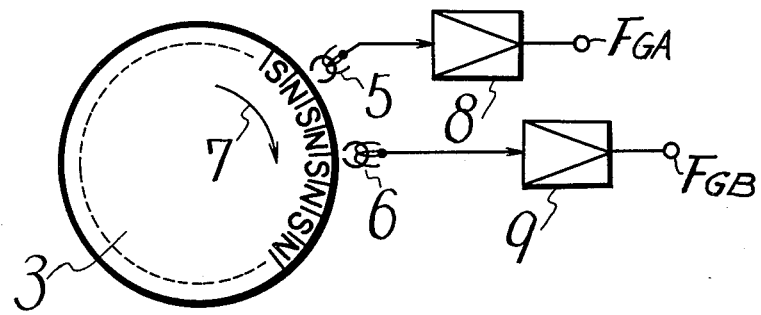
FIG. 3A ($F_{GA}$) PRIOR ART
FIG. 3B ($F_{GB}$) PRIOR ART
FIG. 3C PRIOR ART
FIG. 3D ($F_{GA}$) PRIOR ART
FIG. 3E ($F_{GB}$) PRIOR ART
FIG. 3F PRIOR ART F I G. 7A (Ss) 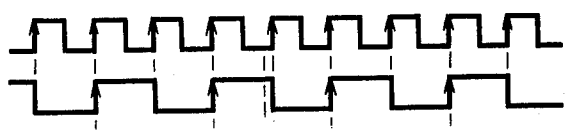
F I G. 7B (S̄2)
F I G. 7C (FG) 
F I G. 7D (S1) 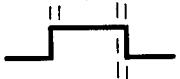
F I G. 7E (S3) 
F I G. 8A (Ss) 
F I G. 8B (FG) 
F I G. 8C (S̄4) 
F I G. 8D (S5) 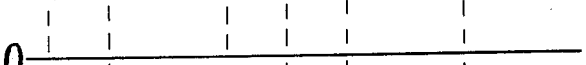
F I G. 8E (FG) 
F I G. 8F (S̄4) 
F I G. 8G (S5) 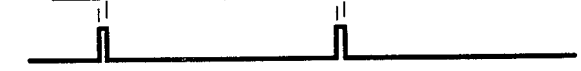

APPARATUS FOR CONTROLLING THE SPEED AND DIRECTION OF ROTATION OF A DC MOTOR

BACKGROUND OF THE INVENTION

1. Field of the Invention

This invention relates generally to speed and directional control of a DC motor, and more specifically is directed to bidirectional control of a DC motor with a single speed sensor.

2. Description of the Prior Art

The prior art contains examples of DC motor control circuits which permits constant torque to be developed by the motor regardless of the rotational angle of the motor shaft. For example, U.S. Pat. No. 3,383,574 and No. 3,517,289 teach the use of Hall effect elements which control the current fed to motor armature windings in sinusoidal relationship to the rotor angular portion to achieve such constant torque. The noted patents also teach that torque, and consequently motor rotation, in either direction is achievable by controlling the direction of current through the Hall effect elements.

U.S. Pat. No. 3,839,661 teaches a DC motor using Hall effect elements and a speed control circuit which controls the Hall effect elements in proportion to the speed of the rotor.

A convenient source of a speed signal which can be used to generate speed control signals is a sensor or frequency generator which generates a frequency proportional to the speed of the rotor. A sensor of such type may employ magnetic pole pieces arranged with alternating north-south polarities and being uniformly spaced about a disc which rotates with the rotor. One or more pickup heads fixedly disposed within the influence of the pole pieces has induced therein an alternating signal with a frequency proportional to the rotational speed of the disc. A frequency-to-voltage converter is provided to generate an analog voltage having a linear inverse relationship to the frequency output of the pickup head over a substantial range of frequencies. When the voltage output of the frequency-to-voltage converter is employed to control the current to the Hall effect elements and the resulting torque of the motor, a substantially constant speed of the motor can be achieved.

The output voltage of the frequency-to-voltage converter of the prior art becomes zero at and above a certain cutoff input frequency. If the speed of the motor overshoots the desired speed and exceeds the speed which generates the cutoff input frequency due to, for example, excessive acceleration during start-up or during speed change, the zero output of the frequency-to-voltage converter, if directly used to control the current to the Hall effect elements results in zero current to the Hall effect elements and zero torque from the motor. Thus, the motor merely coasts until turntable load, friction and windage reduce its speed sufficiently to return the input frequency to the frequency-to-voltage converter to the range of the linear relation. When in this linear range, the motor speed is controlled to the desired speed.

U.S. Pat. No. 4,135,120, issued Jan. 16, 1979 and having a common assignee with the present application, employs an offset voltage which is combined with the output voltage of the frequency-to-voltage converter to reverse the sense of the current through the Hall effect elements before the output voltage of the frequency-to-voltage converter reaches zero. Thus, the motor torque is actually reversed in the frequency region beyond and just less than the cutoff frequency. This reversed torque rapidly decreases the motor speed and forces the motor to rotate in the proper forward control direction.

In the system described in U.S. Pat. No. 4,135,120, reversal of inputs can intentionally or unintentionally cause a reverse of the direction of motor torque. A problem arises with the described device in the reversed-torque speed region near and above the cutoff frequency. Assuming that the motor is arranged for rotation in an arbitrarily chosen positive direction but is, for example, manually rotated in the negative or reverse direction at a speed high enough to generate the cutoff frequency, then the offset voltage is effective, upon the attainment of the cutoff frequency in the negative direction, to produce a negative torque. Since the motor is already rotating in the negative direction, the applied negative torque tends to further increase its speed in the negative direction. In this runaway condition, the speed can continue to increase until the equipment is damaged.

Speed sensors of the type described are bidirectional, that is, their outputs contain no indication of the direction of rotation. One method of avoiding runaway involves sensing the actual direction of rotation of the motor. An arrangement for sensing the rotational direction employs two pickup heads disposed within the influence of the pole pieces so that a predetermined phase difference, for example, of 90 degrees, exists between their respective speed signals, and the phase difference permits discrimination of the direction of rotation. However, such arrangement requires an additional or second pickup head and an associated amplifier as well as a circuit for interpreting the phase difference between the two speed signals and other circuits for preventing driving in the improper direction when the latter is discriminated. Such additional equipment increases the cost and complexity of the apparatus.

OBJECTS AND SUMMARY OF THE INVENTION

Accordingly, an object of this invention is to provide an apparatus for controlling the speed of a DC motor which overcomes the above-mentioned drawbacks of the prior art.

More specifically, an object of this invention is to provide a control apparatus which prevents runaway when a DC motor is turned at high speed in the direction opposite to the selected direction.

Another object is to provide a control apparatus, as aforesaid, which employs only a simple motor speed detector or sensor.

A further object of this invention is to provide a control apparatus, as aforesaid, which includes means for detecting a speed of the DC motor exceeding twice the desired speed and then for removing the motor drive signal until the motor speed decreases to a value just below the desired speed.

According to an aspect of the invention, an apparatus is provided for controlling driving power to a DC motor in the vicinity of a predetermined motor speed in a selected direction comprising: first detector means for detecting an excessive motor speed which exceeds the predetermined motor speed by a predetermined amount, power removing means for removing the driving power from the DC motor in response to detection of the excessive motor speed so that the motor slows down, with such power removing the driving power from the motor as the latter slows down below the excessive speed detected by the first detector means, and second detector means for detecting that the motor speed is less than the predetermined motor speed, whereupon the power removing means is effective to restore the driving power to the DC motor in response to detection by the second detector means so that control of the motor in the vicinity of the predetermined motor speed is resumed.

The above, and other objects, features and advantages of the present invention, will become apparent from the following description read in conjunction with the accompanying drawings in which like reference numerals designate the same elements.

BRIEF DESCRIPTION OF THE DRAWINGS

FIG. 1 is a schematic side elevational view of a brushless DC motor direct driving a turntable and a rotary disc of a speed signal generating device;

FIG. 2 is a schematic plan view of a speed sensing device which employs two pickup heads and associated amplifiers according to the prior art;

FIGS. 3A-3F are waveform diagrams to which reference will be made in explaining the operation of the prior art speed sensing device shown in FIG. 2;

FIGS. 7A-7E show waveform diagrams to which reference will be made in describing the manner in which low speed detection is performed; and FIGS. 8A-8G show waveform diagrams to which reference will be made in explaining the manner in which overspeed detection is performed.

DETAILED DESCRIPTION OF THE PREFERRED EMBODIMENT

Figure 4:
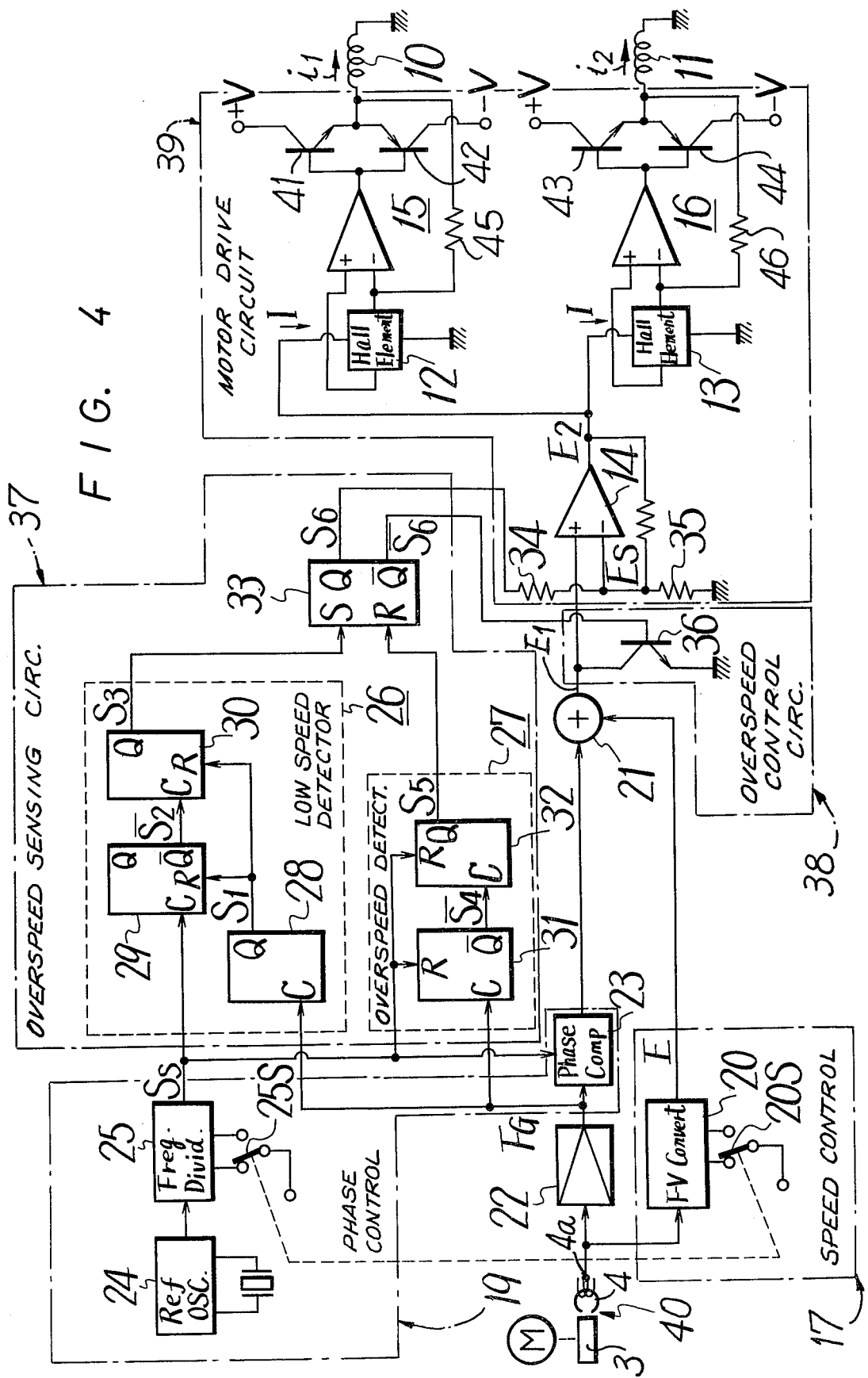
FIG. 4 is a block diagram of a control apparatus according to an embodiment of the present invention.

Referring first to FIG. 1, there is shown a general arrangement of a rotary device such as a phonograph turntable 2 which is directly driven by a shaft 1a of a DC motor 1. A rotary disc 3 of a speed-signal generating device 40 is also secured to the shaft 1a for rotation therewith. The rotary disc 3 is provided with means which can be sensed by a pickup head 4 to generate a signal of a frequency which varies according to the rotational speed of the rotary disc 3 and the turntable 2. Such means on the rotary disc 3 which can be sensed may consist of periodic optical markings which may be sensed by an electro-optical pickup head, magnetic poles which may be sensed by a magnetic sensor or the like. Merely by way of illustration in the present application, the rotary disc 3 is provided with a plurality of magnetic pole pieces, as indicated at N and S on FIG. 2, and pickup head 4 is a magnetic pickup head which applies an alternating signal to terminal 4a which varies in frequency in proportion to the rotational speed of rotary disc 3. According to the present invention, only the single pickup head 4 of FIG. 1 is required even when a bidirectional rotation capability is provided rather than the two pickup heads which are required to sense the direction of rotation in accordance with prior art, as typified by FIG. 2.

More particularly, in the prior art arrangement of FIG. 2, a first conventional pickup head 5 senses the passage of the magnetic pole pieces past its gap and applies an alternating signal to a first amplifier 8 which may amplify and shape the signal into a first pulses output $F_{GA}$. A second conventional pickup head 6 and an amplifier 9 similarly produce a second pulses output $F_{GB}$.

Pickup heads 5 and 6 are angularly spaced apart by an electrical angle of 90 degrees so that the phases of their pulsed output $F_{GA}$ and $F_{GB}$ are 90 degrees apart. Thus, by examining the phases of the pulses outputs $F_{GA}$ and $F_{GB}$, the direction of rotation can be determined.

For example, when rotary disc 3 is rotated in the clockwise direction indicated by the arrow 7 on FIG. 2, the pulsed outputs $F_{GA}$ and $F_{GB}$ may have the relationship shown in FIGS. 3A and 3B. If pulsed output $F_{GA}$ is sampled and held by means of conventional circuits at the positive going transitions of pulsed output $F_{GB}$ indicated by the arrows on FIG. 3B, the result is the continuous high signal at the level "1" shown on FIG. 3C.

Conversely, if rotary disc 3 is rotated in the counterclockwise direction, the relationships between pulse signals $F_{GA}$ and $F_{GB}$ are as shown in FIGS. 3D and 3E. In that case, if pulsed output $F_{GA}$ is sampled and held at the positive going transitions of pulsed output $F_{GB}$ indicated by the arrows in FIG. 3E, the result is the continuous low signal level "0" shown on FIG. 3F. Thus, the sample and held signal is high during clockwise rotation of rotary disc 3 and low during counterclockwise rotation thereof so that the direction of rotation can be discriminated thereby.

However, the prior art arrangement of FIG. 2 features a pickup head 6 with an associated amplifier circuit 9 in addition to the pickup head 5 and amplifier 8, as well as a circuit for interpreting the phase difference between the two speed signals and other circuits for preventing driving in the improper direction. This additional equipment increases the cost and complexity of the apparatus.

Figure 5:
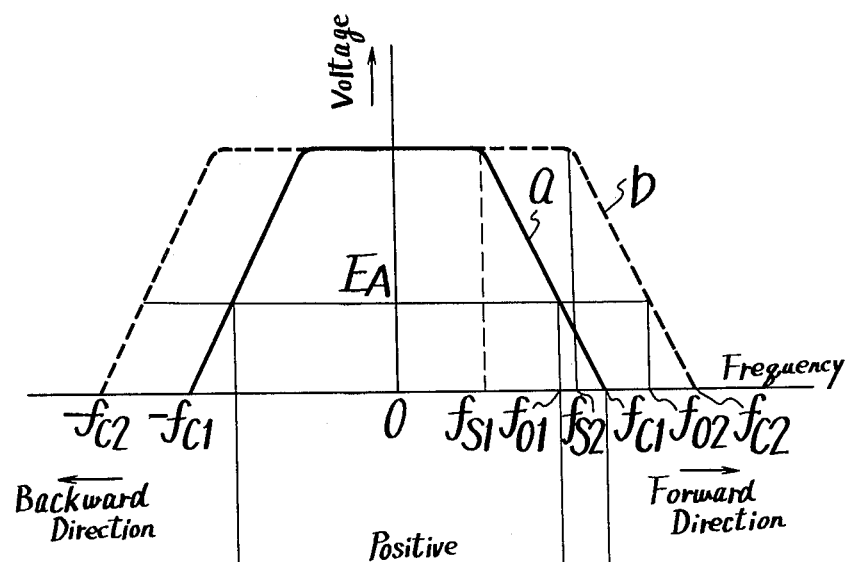
FIG. 5 is a graph showing the frequency-voltage characteristic of a frequency-to-voltage converter included in the apparatus of FIG. 4.

Referring now to FIG. 4, it will be seen that, in an apparatus according to this invention, as there illustrated, a speed control circuit 17 receives the variable frequency speed indicating signal from the single pickup head 4 at its input and generates an output voltage which is linearly related to the frequency of such speed indicating signal. Referring momentarily to FIG. 5, which shows the output voltage of speed control circuit 17 versus its input frequency for both forward and backward rotation, it will be noted that solid line curve a, which represents the characteristic for one desired speed, for example 33⅓ rpm, is high and constant from zero frequency to a knee frequency $f_{S1}$ and thereafter decreases linearly with increasing frequency from $f_{S1}$ to $f_{C1}$. At and above the frequency $f_{C1}$ the output voltage of speed control circuit 17 becomes and remains zero. The dashed curve b has a shape similar to that of curve a, and represents the output voltage-input frequency characteristic for a higher desired speed, for example, 45 rpm. The voltage-frequency relationship is symmetrical about zero frequency for forward and backward rotation of the turntable 2 and contains no information regarding the direction of rotation which results in a particular output voltage. Referring again to FIG. 4, it will be seen that the output voltage E of speed control 17 is applied to one input of an adder 21.

The variable frequency speed signal $F_G$ from pickup head 4 is also applied to a phase control circuit 19. Phase control circuit 19 produces a signal which is related to the phase difference between the speed signal $F_G$ and a reference signal, as will be later explained. The output of phase control circuit 19 is applied to a second input of adder 21. The output of adder 21 is a motor control voltage $E_1$ which is applied through an overspeed control circuit 38 and a motor drive circuit 39. The motor drive circuit 39 generates a first drive current $i_1$ which is supplied to a first stator winding 10 of the motor 1 and a second drive current $i_2$ which is supplied to a second stator winding 11 of the motor. For simplification of the description, it is assumed that the motor is a two pole motor and that stator windings 10 and 11 are located 90 electrical degrees from each other.

The speed signal $F_G$ from pickup head 4 is also applied to the input of an overspeed sensing circuit 37. The overspeed sensing circuit 37 responds to an excessive frequency of speed signal $F_G$ by applying a control signal to overspeed control circuit 38 which disconnects the motor control voltage $E_1$ from the motor drive circuit 39. In the absence of the motor control voltage $E_1$ to produce motor driving power by way of drive currents $i_1$ and $i_2$, motor 1 and turntable 2 begin to slow down from turntable load, friction and windage. As motor 1 and turntable 2 slow down below the overspeed threshold, overspeed sensing circuit 37 maintains overspeed control circuit 38 in the condition which disconnects motor control voltage $E_1$ from motor drive circuit 39 until the speed signal from pickup head 4 falls just below that corresponding to the desired positive or negative rotational speed. When the actual speed falls just below the desired rotational speed, overspeed sensing circuit 37 permits overspeed control circuit 38 to return to the condition in which motor control voltage $E_1$ is again applied to motor drive circuit 39 and permits controlled driving of the motor 1 to be resumed.

The operation of motor drive circuit 39 is explained in detail in the previously noted U.S. Pat. No. 4,135,120, which is herein embodied by reference. Consequently, an extended discussion of the manner in which motor drive circuit 39 and motor 1 cooperate to produce a constant torque independent of the angular position of the motor armature is not required herein. The following brief description which refers to FIG. 4 is sufficient for understanding the present invention.

Two Hall effect elements 12 and 13 and the associated stator windings 10 and 11 of motor 1 are disposed so as to be 90 electrical degrees apart relative to the rotor magnet, not shown. The Hall effect elements 12 and 13 are supplied with a DC current I from a differential amplifier 14. The DC current I is dependent on the motor control voltage $E_1$ at a positive input of differential amplifier 14 and an offset voltage $E_S$ at a negative input of the differential amplifier as will be explained.

As is well known, Hall effect elements, having a constant current passing therethrough, generate a voltage which is proportional to the magnitude of a magnetic field to which they are subjected. As the motor armature or rotor rotates through an angle $\phi$, the magnetic flux $B_1$ intersecting stator winding 10 and the magnetic flux $B_2$ intersecting stator winding 11 are expressed as follows:

$$B_1 = B_m \sin \theta \qquad (1)$$

$$B_2 = B_m \cos \theta \qquad (2)$$

Where: $B_m$ is a constant.

As previously noted, the voltage output of a Hall effect element is proportional to the magnetic field to which it is subjected. Consequently, the voltage outputs of Hall effect elements 12 and 13, when applied to linear amplifiers 15 and 16, respectively, produce voltages which are sinusoidally related to the angular position of the motor armature or rotor so long as the current I is constant. A pair of transistors 41 and 42 are coupled to the output of linear amplifier 15 to generate a drive current $i_1$ which is related in amplitude and polarity to the voltage input to linear amplifier 15. Similarly, transistors 43 and 44 produce a drive current $i_2$ which is related in amplitude to the voltage input to linear amplifier 16.

As a result of the relationships described, drive currents $i_1$ and $i_2$ fed to stator windings 10 and 11, respectively, are expressed as follows:

$$i_1 = K \sin \theta \qquad (3)$$

$$i_2 = K \cos \theta \qquad (4)$$

Where K is a constant which is a function of the Hall effect element response and the gain of linear amplifiers 15 and 16.

Forces $F_1$ and $F_2$ exerted by stator windings 10 and 11 on the armature or rotor magnet are expressed as follows:

$$F_1 = i_1 \cdot B_1 = B_m K \sin^2 \theta \qquad (5)$$

$$F_2 = i_2 \cdot B_2 = B_m K \cos^2 \theta \qquad (6)$$

The total force F exerted on the rotor magnet or armature is:

$$\begin{aligned} F &= F_1 + F_2 \\ &= B_m K (\sin^2 \theta + \cos^2 \theta) \\ \text{but } (\sin^2 \theta &+ \cos^2 \theta) = 1 \\ \therefore F &= B_m K \end{aligned} \qquad ...(7)$$

The foregoing equation shows that the force F exerted on the armature is constant regardless of the angle $\theta$.

A feedback resistor 45 feeds back the voltage at the common emitters of transistors 41 and 42 to the negative input of linear amplifier 15. This avoids notching in drive current $i_1$ due to the base emitter drops of transistors 41 and 42 as the voltage output of linear amplifier 15 passes from positive through zero to negative or vice versa. Feedback resistor 46 operates similarly to avoid notching in drive current $i_2$.

The torque applied to the motor 1 is related to the magnitudes of drive currents $i_1$ and $i_2$ which are, in turn, related to the magnitude of the constant DC current I which is applied to Hall effect elements 12 and 13. Consequently, by controlling the magnitude of the constant DC current I, the torque of the motor 1 can be controlled. Furthermore, the polarity of the DC current I determines the polarity of the drive currents $i_1$ and $i_2$ and consequently determines the direction in which the torque is applied.

Figure 6:
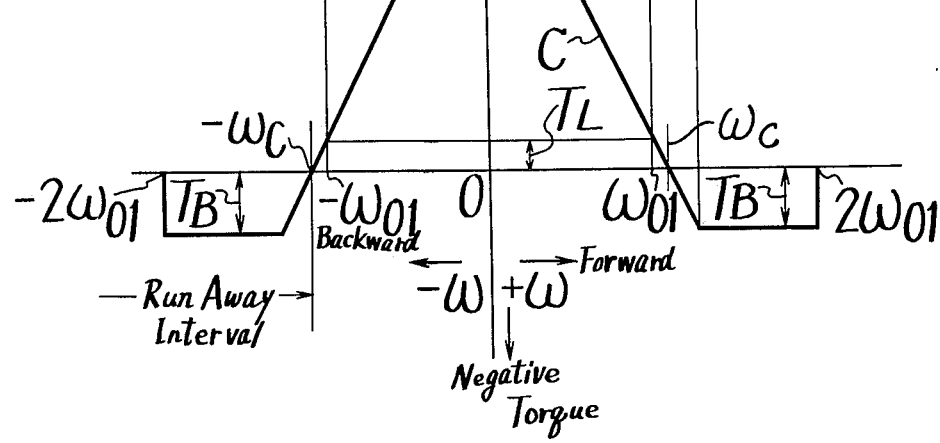
FIG. 6 is a graph showing the relation of motor speed to the torque produced by the control apparatus according to the present invention.

The offset voltage $E_S$ is shown to be generated at the junction of voltage divider resistors 34 and 35 and is applied to the negative input of differential amplifier 14. FIG. 6 shows the effect of offset voltage $E_S$ on motor torque as motor control voltage $E_1$ is varied through its range in response to changing motor speed by the output of speed control circuit 17, ignoring for the time being the output of phase control circuit 19. The torque generated by the motor varies linearly with speed, or the frequency speed signal $F_G$, in positive and negative torque regions similarly to the voltage variation of solid line curve a shown on FIG. 5. However, prior to the cutoff frequency $f_{C1}$ of speed control circuit 17, the output voltage $E_2$ of differential amplifier 14 passes through zero and becomes negative due to the offset voltage $E_S$ as the negative input of amplifier 14. This produces the negative torque shown in FIG. 6 beyond a cutoff speed $\omega_C$. The negative torque increases to a value $T_B$ which corresponds to the cutoff frequency $f_{C1}$ (FIG. 5) and thereafter remains constant at $T_B$ for higher positive speeds. At the desired speed $\omega_{O1}$ or $-\omega_{O1}$, a relatively low torque $T_L$ is sufficient to maintain the desired speed of, for example, $33\frac{1}{3}$ rpm or 45 rpm. If the speed varies about $\omega_{O1}$, the speed is rapidly returned to the desired value by the oppositely acting torque. Beyond a speed corresponding to $f_{C1}$ on FIG. 5, the constant negative torque $T_B$ acts to rapidly decelerate the turntable to the desired speed. In the absence of offset voltage $E_S$, a speed in excess of that corresponding to frequency $f_{C1}$ would produce zero torque and would merely permit the turntable and motor to coast. If a speed substantially higher than the desired speed is attained, for example, while initially starting up the turntable or in changing the speed thereof from 45 rpm to $33\frac{1}{3}$ rpm, the required long time for the turntable to decelerate due to frictional forces alone to a speed below the speed which corresponds to frequency $f_{C1}$ is inconvenient. The generation of negative torque $T_B$ in the apparatus according to this invention avoids the mentioned difficulty.

Reversing the inputs to differential amplifier 14, that is, applying voltages $E_S$ and $E_1$ to the positive and negative inputs of amplifier 14, reverses the sense of the DC current I and consequently can provide for reverse running of the motor.

If the motor drive circuit 39 is connected as shown to drive the turntable in the forward direction, but the turntable is manually rotated in the backward or reverse direction at a speed exceeding $-\omega_C$, the resulting reverse torque $T_B$ further urges the turntable in the reverse direction. Thus, the full value of $T_B$ is available to accelerate the turntable in the direction without limit on its maximum speed and runaway condition may result. The present invention provides a solution for this problem, as will be explained below.

Returning again to FIG. 4, it will be seen that speed control circuit 17 includes, in addition to frequency-to-voltage converter 20 which generates the variable DC voltage shown in FIG. 5 in proportion to the frequency of the speed signal at its input, a speed change switch 20S which is actuable to change over characteristics of the frequency-to-voltage converter 20 between the solid line curve a and the dashed line curve b on FIG. 5 to accommodate the selection of different rotational speeds.

A reference oscillator 24 in phase control circuit 19, which is preferably crystal controlled, produces a fixed frequency output which is applied to the input of a frequency divider 25. Frequency divider 25 also has a speed change switch 25S associated therewith and which is gnaged with speed change switch 20S. The speed change switch 25S controls the dividing ratio of frequency divider 25 to establish, at its output, a frequency of the reference signal $S_S$ which is appropriate to the selected speed. The reference signal $S_s$ is applied to one input of a phase comparator 23. The speed signal from pickup head 4 is amplified in an amplifier 22 and the amplified speed signal $F_G$ is applied to the other input of phase comparator 23. When the turntable is rotating at precisely the desired speed, the frequency and phase of the speed signal $F_G$ from amplifier 22 exactly match the frequency and phase of reference signal $S_S$ from frequency divider 25. The comparison output of phase comparator 23 is the output of phase control circuit 19 applied to adder 21. The overspeed sensing circuit 37 senses when a speed of $-2\omega_{O1}$ or $+2\omega_{O1}$ occurs without providing information regarding the direction of such excessive speed. The overspeed sensing circuit 37 thereupon grounds both inputs to differential amplifier 14 and reduces DC current I to zero. This condition is sustained until the turntable speed is decreased by its load, friction and windage to just below $-\omega_{O1}$, at which time the inputs $E_1$ and $E_S$ are again applied to amplifier 14. When the overspeed sensing circuit reconnects the control voltage $E_1$ and bias or offset voltage $E_S$ to differential amplifier 14, the resulting torque is shown on FIG. 6 to be in the forward direction which causes the motor and turntable speed to rapidly slow down past zero and then accelerate in the positive or forward direction until the actual speeds nears the vicinity of the desired speed $\omega_{O1}$. In the vicinity of the speed $\omega_{O1}$, normal control operations stabilize the speed and maintain the desired speed $\omega_{O1}$.

In the illustrated embodiment, an overspeed detector 27 in overspeed sensing circuit 37 provides an output $S_5$ when the speed signal $F_G$ attains a frequency in excess of twice the frequency of reference signal $S_S$. More particularly, overspeed detector 27 is shown to include flip-flops 31 and 32. The speed signal $F_G$ is applied to a clock input C of flip-flop 31. A reset output $\bar{Q}$ of flip-flop 31 applies a signal $\bar{S}_4$ to a clock input C of flip-flop 32. A set output Q of flip-flop 32 provides the control signal or output $S_5$ which is applied to a reset input R of a control flip-flop 33 in overspeed sensing circuit 37. The reference signal $S_S$ is applied in parallel to reset inputs R of flip-flops 31 and 32. In order for signal $S_5$ to go high, two positive going transitions of speed signal $F_G$ must occur during the positive half cycle of reference signal $S_S$. Two positive going transitions of speed signal $F_G$ during a positive half cycle of reference signal $S_S$ when the frequency of speed signal $F_G$ is at least slightly greater than twice the frequency of reference signal $S_S$.

FIGS. 8A-8D show a situation in which speed signal $F_G$ has a frequency which is less than twice the frequency of reference signal $S_S$. In such case, set output $\bar{S}_4$ (FIG. 8C) of flip-flop 31 is occasionally triggered to the high condition, but the output signal $S_5$ (FIG. 8D) from flip-flop 32 remains low because a second positive going edge of signal $F_G$ (FIG. 8B) can never occur during a single positive alternative of reference signal $S_S$ (FIG. 8A). Thus, flip-flop 31 is always reset before its reset output $\bar{S}_4$ (FIG. 8C) can be effective to trigger flip-flop 32 into its set condition and generate signal $S_5$. Thus, signal $S_5$ remains low (FIG. 8D).

FIGS. 8A and 8E-8G illustrate the condition when speed signal $F_G$ has a frequency slightly exceeding twice the frequency of reference signal $S_S$. The first positive transition of signal $\bar{S}_4$ indicated by the first arrow on FIG. 8F occurs just before reference signal $S_S$ is applied, as a reset signal, to flip-flops 31 and 32. Consequently, the positive going transition of $\bar{S}_4$ is effective to trigger flip-flop 32 into its set condition and to thereby generate output $S_5$ (FIG. 8G) which is applied to the reset input of control flip-flop 33. This resets control flip-flop 33 and provides signal $S_6$ at its set output Q with the value "0", while the signal $S_6$ at its reset output $\bar{Q}$ has the value "1". Later occurrences of output signal $S_5$ (FIG. 8G) are irrelevant since control flip-flop 33 remains in the reset condition until again set in a manner which will be hereinafter described.

The reset output $\bar{S}_6$ of control flip-flop 33 is applied to the base of an overspeed control transistor 36 in overspeed control circuit 38. The high value of output $\bar{S}_6$ turns ON overspeed control transistor 36 and provides a low resistance path to ground for motor control voltage $E_1$. This effectively grounds the positive input of differential amplifier 14. The output $S_6$ of control flip-flop 33 is applied to voltage dividing resistor 34 so that, when output $S_6$ is "0", the offset voltage $E_S$ applied to the negative input of the differential amplifier 14 is zero. With both inputs of amplifier 14 effectively grounded, the output voltage $E_2$ thereof is zero. Consequently, the DC current I fed to the Hall effect elements 12 and 13 is also zero. The drive currents $i_1$ and $i_2$ to stator windings 10 and 11 are also zero and motor 1 begins to slow down.

Low speed detector 26 produces an output $S_3$ which is effective to restore drive currents $i_1$ and $i_2$ only after the frequency of speed signal $F_G$ decreases to less than the frequency of reference signal $S_S$. Low speed detector 26 is shown to include a flip-flop 28 which receives speed signal $F_G$ at its clock input C and flip-flops 29 and 30 which receive a signal $S_1$ from output Q of flip-flop 28 at their reset inputs R. The reference signal $S_S$ is applied to a clock input C of flip-flop 29, and a signal $\bar{S}_2$ is applied from a reset output $\bar{Q}$ of flip-flop 29 to a clock input C of flip-flop 30. Flip-flops 29 and 30 are of the reset preferred type in which the presence of a low signal at their reset inputs R inhibits triggering by signals at their clock inputs C. The set output $S_1$ of flip-flop 28 is high for one complete cycle of speed signal $F_G$. In order to produce an output $S_3$ from flip-flop 30, two positive going transitions of reference signal $S_S$ must be fed to clock input C of flip-flop 29 during the high condition of the set output $S_1$ from flip-flop 28. The occurrence of two positive going transitions of reference signal $S_S$ during one full cycle of speed signal $F_G$ can only occur when the frequency of speed signal $F_G$ is at least slightly lower than the frequency of the reference signal $S_S$.

Referring to FIGS. 7A-7E, it will be seen that, when speed signal $F_G$ (FIG. 7C) has a frequency lower than that of reference signal $S_S$ (FIG. 7A), a high half cycle of set output $S_1$ (FIG. 7D) from flip-flop 28 is long enough to encounter two positive going transitions of reference signal $S_S$ indicated by the upward pointing arrows on FIG. 7A. Thus, a positive going transition of reset output $\bar{S}_2$ (FIG. 7B) of flip-flop 29 occurs to trigger flip-flop 30 into its set condition. The set output $S_3$ (FIG. 7E) of flip-flop 30 is applied to the set input S of control flip-flop 33 which is thereby triggered into its set condition. The resulting low value of reset output $\bar{S}_6$ of control flip-flop 33 turns OFF overspeed control transistor 36 and thus permits the application of motor control voltage $E_1$ to the positive input of differential amplifier 14. The high voltage occurring at the set output $S_6$ of control flip-flop 33 results in the application of the positive offset voltage $E_S$ to the negative input of differential amplifier 14.

It will be appreciated from the foregoing that, when a turntable and motor controlled in accordance with this invention are accelerated in the direction opposite to the selected forward driving direction at a speed high enough to give rise to acceleration of the turntable in this opposite direction due to reverse torque at speeds above $-\omega_C$ (FIG. 6), overspeed sensing circuit 37 permits the speed to build up only to a value $-2\omega_{O1}$ which is twice the normal speed and at which point the motor drive voltage is removed. This is indicated in FIG. 6 by the cutoff of reverse torque at speeds of $2\omega_{O1}$ and $-2\omega_{O1}$. The motor drive voltage continues to be removed as the motor speed in the reverse direction falls below twice the normal speed and the motor drive voltage is restored only after overspeed sensing circuit 37 has detected that the motor speed is reduced to a value below the normal speed (but still in the reverse direction). At this reduced speed in the reverse direction the motor torque is in the proper direction, i.e. forward, to further retard the reverse rotation of the motor through zero and then to accelerate the motor in the forward direction to the normal speed. In the vicinity of the normal speed in the forward direction, speed and phase control circuits 17 and 19 accurately maintain the motor speed with reference to the reference signal $S_S$. Although a speed twice the desired speed is used as an example of a high speed limit in the illustrative example herein, any speed exceeding $\pm\omega_C$ can be employed as the threshold at which cutoff of the motor driving power occurs.

Having described a specific embodiment of the invention with reference to the accompanying drawings, it is to be understood that the invention is not limited to that precise embodiment, and that various changes and modifications may be effected therein by one skilled in the art without departing from the scope and spirit of the invention as defined in the appended claims.

What is claimed is:

1. Apparatus for controlling the application of driving power to a DC motor so as to maintain a predetermined motor speed in a selected direction comprising: first detector means for detecting a first motor speed which exceeds said predetermined motor speed by a predetermined amount in either said motor selected direction or the opposite direction, power removing means for removing all of said driving power from said DC motor in response to detection of said first motor speed by said first detector means whereby the motor slows down, said power removing means being effective to maintain said driving power removed from said motor as the latter slows down below said first motor speed detected by said first detector means, second detector means for detecting a second motor speed which is less than said predetermined motor speed, said power removing means being further effective to restore said driving power to said DC motor in response to detection by said second detector means of said second motor speed in the selected or opposite direction as said motor slows down for driving said DC motor in said selected direction.

2. Apparatus according to claim 1, further comprising a turntable connected to said motor for rotation therewith.

3. Apparatus according to claim 1, further comprising speed signal generating means for generating cycles of an alternating speed signal having a frequency related to the speed of said DC motor.

4. Apparatus according to claim 3, further comprising reference frequency generating means for generating cycles of a reference frequency signal.

5. Apparatus according to claim 4, wherein said first detector means includes overspeed detector means having a circuit for detecting the occurrence of a first number of cycles of said alternating speed signal during a second number of cycles of said reference frequency signal, and said first number of cycles is larger than said second number of cycles.

6. Apparatus according to claim 5, wherein said first number of cycles is 1 and said second number of cycles is ½.

7. Apparatus for controlling the application of driving power to a DC motor so as to maintain a predetermined motor speed in a selected direction comprising:
speed signal generating means for generating cycles of an alternating speed signal having a frequency related to the speed of said DC motor;
reference frequency generating means for generating cycles of a reference frequency signal;
first detector means for detecting a first motor speed which exceeds said predetermined motor speed by a predetermined amount, said first detector means including overspeed detector means having a circuit for detecting the occurrence of a first number of cycles of said alternating speed signal during a second number of cycles of said reference frequency signal, and said first number of cycles is larger than said second number of cycles;
power removing means for removing said driving power from said DC motor in response to detection of said first motor speed by said first detector means whereby the motor slows down, said power removing means being effective to continue to remove said drive power from said motor as the latter slows down below said first motor speed detected by said first detector means, said power removing means including overspeed control means having a motor drive signal applied thereto, drive means for producing said driving power in proportion to said motor drive signal, and a flip-flop operative to change from a first condition to a second condition in response to detection of said first motor speed by said first detector means, said overspeed control means having means effective in response to said second condition of the flip-flop for shunting said motor drive signal away from said drive means to ground whereby said driving power is removed; and
second detector means for detecting a second motor speed which is less than said predetermined motor speed, said power removing means being further effective to restore said driving power to said DC motor in response to detection by said second detector means of said second motor speed as said motor slows down.

8. Apparatus according to claim 5, wherein said second detector means includes low speed detector means having a circuit for detecting the occurrence of a third number of cycles of said alternating speed signal during a fourth number of cycles of said reference frequency signal, and said fourth number of cycles is larger than said third number of cycles.

9. Apparatus for controlling the application of driving power to a DC motor so as to maintain a predetermined motor speed in a selected direction comprising:
speed signal generating means for generating cycles of an alternating speed signal having a frequency related to the speed of said DC motor;
reference frequency generating means for generating cycles of a reference frequency signal;
first detector means for detecting a first motor speed which exceeds said predetermined motor speed by a predetermined amount, said first detector means including overspeed detector means having a circuit for detecting the occurrence of a first number of cycles of said alternating speed signal during a second number of cycles of said reference frequency signal, and said first number of cycles is larger than said second number of cycles;
power removing means for removing said driving power from said DC motor in response to detection of said first motor speed by said first detector means whereby the motor slows down, said power removing means being effective to continue to remove said driving power from said motor as the latter slows down below said first motor speed detected by said first detector means, said power removing means including overspeed control means having a motor drive signal applied thereto, means causing said driving power to be proportional to said motor drive signal, a flip-flop operative to change from a first condition to a second condition in response to detection of said first motor speed by said first detector means, said overspeed control means being effective in response to said second condition of said flip-flop to shunt said motor drive signal to ground whereby said driving power is removed; and
second detector means for detecting a second motor speed which is less than said predetermined motor speed, said second detector means including low speed detector means having a circuit for detecting the occurrence of a third number of cycles of said alternating speed signal during a fourth number of cycles of said reference frequency signal, and said fourth number of cycles is larger than said third number of cycles, said flip-flop being further operative to change from said second condition to said first condition in response to detection of said second motor speed by said second detector means, said overspeed control means being effective in response to return to said first condition of the flip-flop to cease the shunting of said motor drive signal to ground whereby said power removing means is further effective to restore said driving power to said DC motor in response to detection by said second detector means of said second motor speed as said motor slows down.

10. Apparatus according to claim 4, wherein said second detector means includes low speed detector means having a circuit for detecting the occurrence of one number of cycles of said alternating speed signal during another number of cycles of said reference frequency signal, and said other number of cycles is larger than said one number of cycles.

11. Apparatus according to claim 10, wherein said one number of cycles is 1.

12. Apparatus for controlling the application of driving power to a DC motor so as to maintain a predetermined motor speed in a selected direction comprising:
speed signal generating means for generating cycles of an alternating speed signal having a frequency related to the speed of said DC motor;
frequency-to-voltage converter means for converting said alternating speed signal to a variable DC voltage which has an amplitude inversely proportional to frequency over a substantial frequency range of said alternating speed signal;
means for reversing the direction in which torque acts in said DC motor in response to frequencies of said alternating speed signal exceeding a predetermined cutoff value;

first detector means for detecting a first motor speed which exceeds said predetermined motor speed by a predetermined amount;

power removing means for removing said driving power from said DC motor in response to detection of said first motor speed by said first detector means whereby the motor slows down, said power removing means being effective to continue to remove said driving power from said motor as the latter slows down below said first motor speed detected by said first detector means; and second detector means for detecting a second motor speed which is less than said predetermined motor speed, said power removing means being further effective to restore said driving power to said DC motor in response to detection by said second detector means of said second motor speed as said motor slows down.

13. Apparatus according to claim 12, wherein the reversed direction of torque to said DC motor tends to effect runaway thereof when said DC motor is turned in a direction opposite to said selected direction at a speed high enough to produce a frequency of said alternating speed signal which exceeds said predetermined cutoff value.

14. Apparatus according to claim 12, further comprising reference frequency generating means for generating a reference frequency signal, first means for changing the frequency of said reference frequency signal, second means for changing the relation of said variable DC voltage to said alternating speed signal, said first and second means for changing being arranged for concerted change whereby at least two predetermined motor speeds can be selectively maintained.

15. Apparatus for controlling the application of driving power to a DC motor so as to maintain a predetermined motor speed in a selected direction comprising: speed signal generating means for generating cycles of an alternating speed signal having a frequency related to the speed of said DC motor, reference frequency generating means for generating cycles of a reference frequency signal, an overspeed detector having a first circuit for detecting the occurrence of a first number of cycles of said alternating speed signal during a second number of cycles of said reference frequency signal, said first number of cycles being larger than said second number of cycles, a low speed detector having a second circuit for detecting the occurrence of a third number of cycles of said alternating speed signal during a fourth number of cycles of said reference frequency signal, said fourth number of cycles being larger than said third number of cycles, a source of a motor drive signal, overspeed control means connected between said source of the motor drive signal and ground, means causing said driving power to be proportional to said motor drive signal, a flip-flop having first and second conditions and being operative in response to detection by said overspeed detector to change from its first to its second condition and further operative in response to detection by said low speed detector to change from its second to its first condition, said overspeed control means being made conductive in response to said second condition of the flip-flop to shunt said motor drive signal to ground, and said overspeed control means being made non-conductive in response to said first condition of the flip-flop to permit said motor drive signal to produce said driving power.

16. A rotation control circuit for a rotary member comprising: a rotary member, a motor for rotating said rotary member, a motor drive for selectively generating positive and negative torque in said motor, a frequency generator having a single pickup head for generating a speed signal having a frequency related to the speed of said motor, and control means for controlling the speed of said rotary member to a predetermined substantially constant speed in a selected direction, said control means including first detecting means responsive to said speed signal to detect a first speed which exceeds said predetermined speed by a predetermined amount in either said selected direction or the opposite direction and second detecting means responsive to said speed signal to detect a second speed lower than said predetermined speed, said control means being responsive to detection to said first speed by said first detecting means to remove all torque from said motor and to maintain said torque removed while the motor speed decreases from said first speed, said control means being further responsive to detection by said second detecting means of said second speed in said selected or opposite direction to restore torque to said motor for controlling the speed of said rotary member to said predetermined substantially constant speed in said selected direction.

* * * * *